F. T. REID.
BORING AND GRINDING ATTACHMENT FOR HOLLOW SPINDLE LATHES.
APPLICATION FILED JAN. 22, 1915.
1,207,214. Patented Dec. 5, 1916.
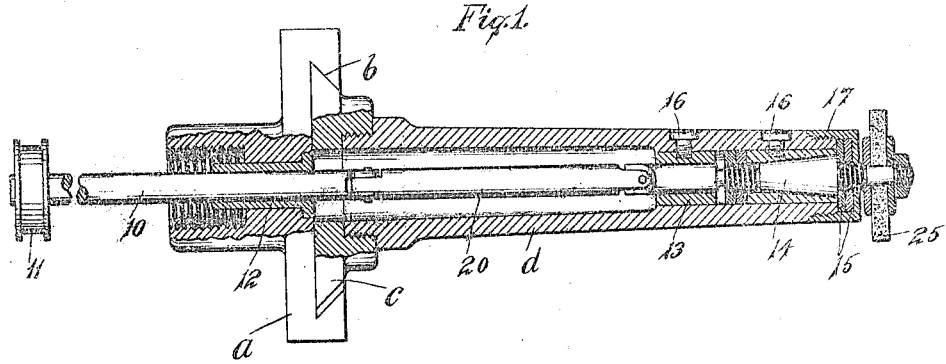
INVENTOR.
Fred T. Reid:

UNITED STATES PATENT OFFICE.

FRED T. REID, OF HARTFORD, CONNECTICUT.

BORING AND GRINDING ATTACHMENT FOR HOLLOW-SPINDLE LATHES.

1,207,214.    Specification of Letters Patent.    Patented Dec. 5, 1916.

Application filed January 22, 1915. Serial No. 3,732.

*To all whom it may concern:*

Be it known that I, FRED T. REID, a citizen of the United States, and a resident of Hartford, in the county of Hartford, State of Connecticut, have invented certain new and useful Improvements in Boring and Grinding Attachments for Hollow-Spindle Lathes, of which the following is a specification.

The object of this invention is to provide an attachment which may be utilized with any of the common forms of hollow spindle lathes, and which can be used for boring and grinding automobile cylinders, and similar parts, although it is particularly well adapted for the work specified.

In the drawings—Figure 1 is a longitudinal section of the attachment. Fig. 2 is an end view thereof. Fig. 3 shows detached views of the boring tool.

To the end of the hollow spindle, which is customarily provided with an exterior screw thread, there is mounted a face plate $a$, having the dovetailed groove $b$ in its front surface to receive the sliding block $c$ on which the hollow arm $d$ is mounted. When the attachment is used for boring, the turning tool $e$ shown in Fig. 3 is secured to the end of the arm by the screw threads, and by the adjustment of the cutter $f$ in its holder, and the adjustment of the block $c$ in the face plate $a$ through the medium of the screw $g$ operated by the hand wheel $h$, the cutter can be brought into proper working relation with the interior of the cylinder, and the rotation of the spindle carrying the complete attachment produces the proper and necessary motion of the cutter. When grinding is to be done, the cutting tool is removed from the spindle, and a shaft 10 inserted from the end of the hollow arm and passed back through the spindle, and at its rear end is provided with a pulley 11 or some other suitable driving means. This shaft is supported by a bearing 12 in the face plate $a$, by a bearing 13 in the arm $d$, and the tapered end of the shaft is supported in the tapered bearing 14 at the end of the arm $d$, the adjusting and lock nuts 15 providing for the proper assembly of these taper bearings, the set screws 16, 16, uniting the bearings with the arm. The cap 17 closes in the end of the arm and acts as a dust cap. The shaft 10 is jointed, an intermediate section 20 acting as a universal joint between the end sections.

25 denotes an emery wheel or other suitable grinding device which is mounted on the shaft 10 and driven thereby at a high speed while the arm $d$ is revolved within the cylinder, carrying the rapidly rotating grinding device about the surface to be acted upon.

The ordinary feed screw of the lathe, or other appropriate part, can be utilized to move the cylinder and tool longitudinally relative to one another in order to cover the entire surface of the work.

This attachment has been designed to provide a very efficient turning and grinding tool which can be made and sold at a reasonable price, to be attached to a standard type of machine, namely, a hollow spindle lathe such as are to be found in the equipment of most small machine shops and garages. It provides the automobile repair man at a very small expense with a tool with which he can produce very accurate and satisfactory work of a kind for which there is a very large demand, and thus avoid the necessity of installing a complete special machine with special tools and fixtures, at large cost.

It is possible that the device as here illustrated and described is susceptible of modification and alteration without departing from the spirit of the invention as set forth in the appended claim.

I claim as my invention:—

The combination with a lathe provided with a hollow spindle, of a grinding attachment adapted to be secured to said hollow spindle, comprising a base mounted upon and for rotation with said spindle, the outer face of the base having parallel dove-tailed flanges, a block having parallel dove-tailed walls slidably mounted beneath the base flanges for transverse movement in a plane at right angles to the longitudinal axis of the hollow spindle, a screw journaled on the base plate with the end thereof in engagement with the sliding block for holding the block in adjusted positions, a hollow arm secured at one of its ends to the front of said sliding block, a shaft extending through said arm and spindle, a universal joint forming a portion of that part of said shaft within said hollow arm dividing the same into three sections, removable bearings for said shaft adjacent each end thereof, a tool mounted on said shaft beyond the end of said hollow arm, and driving means mounted on said shaft beyond the end of said hollow spindle.

FRED T. REID.

Witnesses:
H. E. HART,
A. E. O'BRIEN.